(12) United States Patent
Rafalovich (10) Patent No.: US 6,212,892 B1
(45) Date of Patent: Apr. 10, 2001

(54) AIR CONDITIONER AND HEAT PUMP WITH DEHUMIDIFICATION

(76) Inventor: Alexander Pinkus Rafalovich, 8309 Lacevine Rd., Louisville, KY (US) 40220

( * ) Notice: Subject to any disclaimer, the term of this patent is extended or adjusted under 35 U.S.C. 154(b) by 0 days.

(21) Appl. No.: 09/356,134

(22) Filed: Jul. 17, 1999

Related U.S. Application Data (60) Provisional application No. 60/094,201, filed on Jul. 27, 1998.

(51) Int. Cl.[7] ..................................... F25D 17/08
(52) U.S. Cl. ............................................... 62/90; 62/324.6
(58) Field of Search ............................. 62/90, 173, 324.6

(56) References Cited

U.S. PATENT DOCUMENTS

| | | | |
|---|---|---|---|
| 2,932,178 | * | 4/1960 | Armstrong et al. ................... 62/173 |
| 3,105,366 | * | 10/1963 | Atchison ................................. 62/173 |
| 3,460,353 | * | 8/1969 | Ogata et al. ............................ 62/173 |
| 5,009,078 | * | 4/1991 | Ohkoshi et al. ...................... 62/324.6 |
| 5,040,376 | * | 8/1991 | Ueno .................................... 62/324.6 |
| 5,598,887 | * | 2/1997 | Ikeda et al. ........................... 62/324.6 |

\* cited by examiner

Primary Examiner—William E. Tapolcai (57) ABSTRACT

Described are an air conditioning and heat pump system and methods for conditioning air. The system is provided with valve means, control means, and an auxiliary refrigerant coil in airflow communication with an evaporator. The system operation for cooling and dehumidification air comprises of two separate modes: a cooling mode and a dehumidification mode. In the cooling mode the valve means direct refrigerant to the auxiliary coil a way to absorb heat by refrigerant from conditioning air in the auxiliary coil, and in the dehumidification mode the valve means direct refrigerant to the auxiliary coil a way to reject heat to the air from refrigerant in the auxiliary coil. Thus, refrigerant in the dehumidification mode is subcooled and capacity of the evaporator is increased. In addition, the system is provided with a restrictor to expand refrigerant before the auxiliary coil and to reduce refrigerant evaporating pressure in the evaporator in the dehumidification mode.

9 Claims, 5 Drawing Sheets

AIR CONDITIONER AND HEAT PUMP WITH DEHUMIDIFICATION

This application claims benefit of provisional application Ser. No. 60/094,201 filed Jul. 27, 1998.

FIELD OF THE INVENTION

The present invention relates generally to air conditioners and heat pumps and methods to dehumidify conditioning air.

BACKGROUND OF THE INVENTION

In air conditioners air flowing through an evaporator rejects heat to the evaporating coil and simultaneously condenses moisture on the heat transfer surface of the same coil. However, in high ambient humidity, dehumidification by air conditioners is often not sufficient.

The most popular way of dehumidification requires the installation of a dehumidifier in addition to an air conditioner. In the US the sale of portable dehumidifiers jumped from close to none in 1991 to more than 1,000,000 in 1998. Dehumidifier gives consumers an advantage to control independently both parameters of indoor air: temperature and relative humidity. A thermostat controls the operation of the air conditioner depending on the room temperature and a humidistat controls the operation of the dehumidifier depending on the humidity in the room. However, this technology consumes excessive amount of energy. First, a dehumidifier itself consumes energy to run a compressor and a fan. Second, unlike an air conditioner where the condenser rejects heat to ambient, in a dehumidifier the combined energy of both the compressor and the fan goes back to the room. To offset the influx of this energy the air conditioner should have extra capacity and spend extra energy.

Several attempts have been made to achieve sufficient dehumidification of conditioned air without an extra dehumidifier. Some designers use oversized air conditioners to reduce the evaporating temperature and increase moisture condensation. However, oversized air conditioners with low evaporating temperature reduce air temperature beyond comfortable level. To overcome this beaters to reheat air after evaporators are used. The heaters can be independent of air conditioners, e.g., electrical or heated by steam or hot liquid, or they can reclaim heat from the system condensers. However, the use of such strategies is also energy costly. Much like with an extra dehumidifier, an air conditioner should offset energy generated by the heater. Besides, "independent" heaters consume extra energy, while heaters using "reclaimed" heat require extra connections and extra coils and can not be disconnected when there is no need for reheating air.

The best alternative is to use a properly sized air conditioner to cool and dehumidify indoor air. It is widely recognized, however, that the larger evaporating coil the higher evaporating temperature of refrigerant, and the higher efficiency and capacity of the air conditioner, and the lower temperature of air exiting the evaporator. Still, moisture condensation depends mainly on the temperature of heat transfer surface of the evaporator. Besides, relative humidity of air leaving the evaporator is also a function of the air temperature. Thus, large evaporators can lead to excessive relative humidity of conditioned air that in turn causes damp and mould in the room. At the present time designers often limit the size of evaporators especially for climate with high humidity. On the other hand, the undersized evaporator reduces efficiency and capacity of the air conditioner.

To overcome this some designers use a method that involves heat pipe technology. See, for example, U.S. Pat. Nos. 5,333,470 and 5,448,897. Such design adds two additional heat exchangers to the evaporator: one is the "precooling" coil upstream of the evaporator, another is the Preheating coil downstream of the evaporator. Two coils are filled with phase change medium and connected to each other the way that the coil upstream of the evaporator picks heat from the incoming air and pumps this heat to the coil downstream of the evaporator and to outgoing air. Thus, the temperature of incoming air and the temperature of the heat transfer surfaces of the evaporator are decreased, which causes additional condensation and reduction in absolute humidity of the air. Because the heat from incoming air increases the temperature of air exiting the coil downstream of the evaporator, relative humidity of exiting the air conditioner air is reduced considerably. However, installation and operation of heat pipes generally involves notable expenses. In addition, such systems lead to an excessive pressure drop in air stream because there are two extra heat exchangers. In case there is no need in relative humidity reduction there is some extra complication involved in disabling of the heat pipe.

There is also a solution involving the subcooling technology. See, for example, U.S. Pat. No. 5,689,962 and Carrier Corporation "NoistureMiser". According to U.S. Pat. No. 5,689,962 a subcooling coil is installed in an air passage downstream of the evaporator. Leaving the condenser hot liquid refrigerant expands in a pressure reduction device, then flows to the subcooling coil, rejects heat from refrigerant to air cooled in the evaporator, recondenses, and goes to an expansion device and then to the evaporator. In the evaporator liquid refrigerant evaporates absorbing heat from air. Because refrigerant is preliminary subcooled, capacity of the evaporator increases and the temperature of its heat transfer surface goes down. Same as with the heat pipe technology it causes additional condensation and reduction in absolute humidity of air. Because the temperature of air exiting the subcooling coil after the evaporator is increased, relative humidity of air is reduced. This design is relatively simple and can practically achieve the same effect as heat pipes. However, the system does not have any means to regulate moisture condensation. In case of air with initial low humidity, the subcooling bringing an extra load on the evaporator with reduction of the evaporating temperature causes the reduction in capacity and efficiency compared to the conventional system. Furthermore, if inflow of fresh air is not sufficient and humidity is low, excessive dehumidification can bring relative humidity of air below 50%, which is beyond comfortable conditions. In addition, at the initial moment just after the air conditioner starts there is no cooled air after the evaporator. Subcooling coil itself is also warm. Thus, the refrigerant expanded in the pressure reduction device will not be recondensed completely. This causes excessive pressure drop in the expansion device, which leads to a very low evaporating temperature and reduction in capacity. That, in turn, increases the transition time and efficiency of the system.

Carrier's "MoistureMiser" also uses an extra coil for subcooling to reduce the temperature of the evaporating surfaces and increase moisture condensation. Unlike the system of the U.S. Pat. No. 5,689,962 the extra coil in the "NoistureMiser" can be bypassed and air conditioner works without subcooling. However, this extra coil may often work not as a subcooler but as an additional part of the condenser, especially in the small size systems with the fixed expansion device. When the extra coil works as a subcooler it must be filled with liquid refrigerant. Thus, additional amount of refrigerant is required in the system. In addition, the extra coil adds pressure drop in air stream, which reduces the airflow rate.

SUMMARY OF THE INVENTION

One preferred embodiment of the invention provides an air conditioning and heat pump system for conditioning air including dehumidification. The system includes a compressor for compressing gaseous refrigerant, a condenser for condensing refrigerant exiting the compressor, an expansion device to expand high pressure liquid refrigerant, an evaporator for evaporating liquid refrigerant after the expansion device, an auxiliary coil either for subcooling or for evaporating of liquid refrigerant, valve means to direct refrigerant flow either a way to absorb heat by refrigerant from conditioning air in the auxiliary coil or a way to reject heat to the air from refrigerant in the auxiliary coil, a fan for moving air to be conditioned against the evaporator and against the auxiliary coil, and control means to control the operation of the compressor and the fan and the position of the valve means.

Further in accordance with the present invention, a four-way reversing valve as the valve means is provided.

According to yet a further aspect of the invention, a receiver to accommodate extra amount of liquid refrigerant is provided.

In accordance with yet another aspect of the invention, the system further comprises a restrictor positioned after the condenser. The restrictor expands refrigerant in one direction and allows a free pass in the other direction.

In the several embodiments of the invention, the control means include a thermostat and a humidistat, an evaporator temperature sensor, and a time relay to control the valve means and the system operation. Depending on the thermostat and the humidistat settings and on the conditions of air the system is either in operation or off. While the system is in operation, the valve means direct refrigerant flow either a way to absorb heat by refrigerant from conditioning air in the auxiliary coil or a way to reject heat to the air from refrigerant in the auxiliary coil. The evaporator temperature sensor shows when the temperature of the evaporator surface drops below some predetermined level. To prevent building of ice on the surface control means turn off the compressor and start the fan. The time relay controls the valve means to direct refrigerant at the beginning of the system operation the way to absorb heat by refrigerant in the auxiliary coil.

According to yet another aspect of the invention, the control means include a regulator with a time relay to control the time-share and to provide time limitations of the positioning of the valve means to direct refrigerant either the way of rejecting heat to the air from refrigerant in the auxiliary coil or the way of absorbing heat from the air by refrigerant in the auxiliary coil.

According to another preferred embodiment of the invention, a method for cooling and dehumidification of air using an air conditioning and heat pump system is provided. The system includes a refrigerant circuit and an air circuit. The refrigerant circuit comprises of a compressor, a condenser, an expansion device, an auxiliary coil, an evaporating coil, and valve means to direct refrigerant flow after the condenser either to the auxiliary coil or to the expansion device and to direct refrigerant flow after the auxiliary coil either to the expansion device or to the evaporating coil. The air circuit includes a fan to move air to be conditioned. The system operates in two modes: a cooling mode and a dehumidification mode. Operation in the cooling mode comprises of the steps of compressing gaseous refrigerant in the compressor, condensing refrigerant in the condenser, flowing liquid refrigerant to the expansion device, expanding refrigerant in the expansion device, flowing refrigerant to the auxiliary coil, partly evaporating refrigerant in the auxiliary coil to cool the coil and passing air, flowing partly liquid and partly vapor refrigerant to the evaporating coil, completely evaporating refrigerant in the evaporating coil to cool the coil and passing air, flowing vaporized refrigerant to the compressor, flowing the stream of warm air against the evaporating coil and against the auxiliary coil to cool the air.

Operation in the dehumidification mode comprises of the steps of compressing gaseous refrigerant in the compressor, condensing refrigerant in the condenser, flowing liquid refrigerant to the cooled auxiliary coil, subcooling liquid refrigerant in the auxiliary coil and partly warming passing air, flowing liquid refrigerant after the auxiliary coil to the expansion device, expanding refrigerant in the expansion device, flowing refrigerant to the evaporating coil, evaporating refrigerant in the evaporating coil and cooling and dehumidifying passing air, flowing vaporized refrigerant to the compressor, flowing the stream of warm air against the evaporating coil to cool and dehumidify the air, flowing the cooled and dehumidified air against the auxiliary coil to subcool liquid refrigerant and to warm the air.

In another embodiment of the present invention, a method for cooling and dehumidification of air using an air conditioning and heat pump system is provided. The system includes a refrigerant circuit and an air circuit. The refrigerant circuit comprises of a compressor, a condenser, an expansion device, a restrictor expanding refrigerant in one direction and allowing a free pass in the other direction, an auxiliary coil, an evaporating coil, and valve means. The valve means direct refrigerant flow after the condenser either to the restrictor and then to the auxiliary coil or to the expansion device and then to the auxiliary coil. After the auxiliary coil the valve means direct refrigerant flow either to the expansion device and then to the evaporating coil or to the restrictor and then to the evaporating coil. The air circuit includes a fan to move air to be conditioned. The system operates in two modes: a cooling mode and a dehumidification mode. Operation in the cooling mode comprises of the steps of compressing gaseous refrigerant in the compressor, condensing refrigerant in the condenser, flowing liquid refrigerant to the expansion device, expanding refrigerant in the expansion device, flowing refrigerant to the auxiliary coil, partly evaporating refrigerant in the auxiliary coil to cool the coil and passing air, flowing refrigerant to the restrictor, flowing refrigerant through the restrictor in the free pass direction, flowing partly liquid and partly vapor refrigerant to the evaporating coil, completely evaporating refrigerant in the evaporating coil to cool the coil and passing air, flowing vaporized refrigerant to the compressor, flowing the stream of warm air against the evaporating coil and against the auxiliary coil to cool the air.

Operation in the dehumidification mode comprises of the steps of compressing gaseous refrigerant in the compressor, condensing refrigerant in the condenser, flowing liquid refrigerant to the restrictor, expanding refrigerant in the restrictor, flowing refrigerant to the cooled auxiliary coil, condensing a part of refrigerant vaporized in the restrictor and subcooling liquid refrigerant in the auxiliary coil and partly warming passing air, flowing cooled liquid refrigerant after the auxiliary coil to the expansion device, expanding refrigerant in the expansion device, flowing refrigerant to the evaporating coil, evaporating refrigerant in the evaporating coil and cooling and dehumidifying passing air, flowing vaporized refrigerant to the compressor, flowing the stream of warm air against the evaporating coil to cool and dehumidify the air, then flowing the cooled and dehumidified air against the auxiliary coil to condense and subcool liquid refrigerant and to warm the air.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is hereby included, such alterations and further modifications of the principles of the invention as illustrated therein being contemplated as would normally occur to one skilled in the art to which this invention relates.

For simplification of the schematic and to promote the better understanding of the core of the present invention a regular four-way valve of a conventional heat pump is omitted on the drawings.

Figure 1:
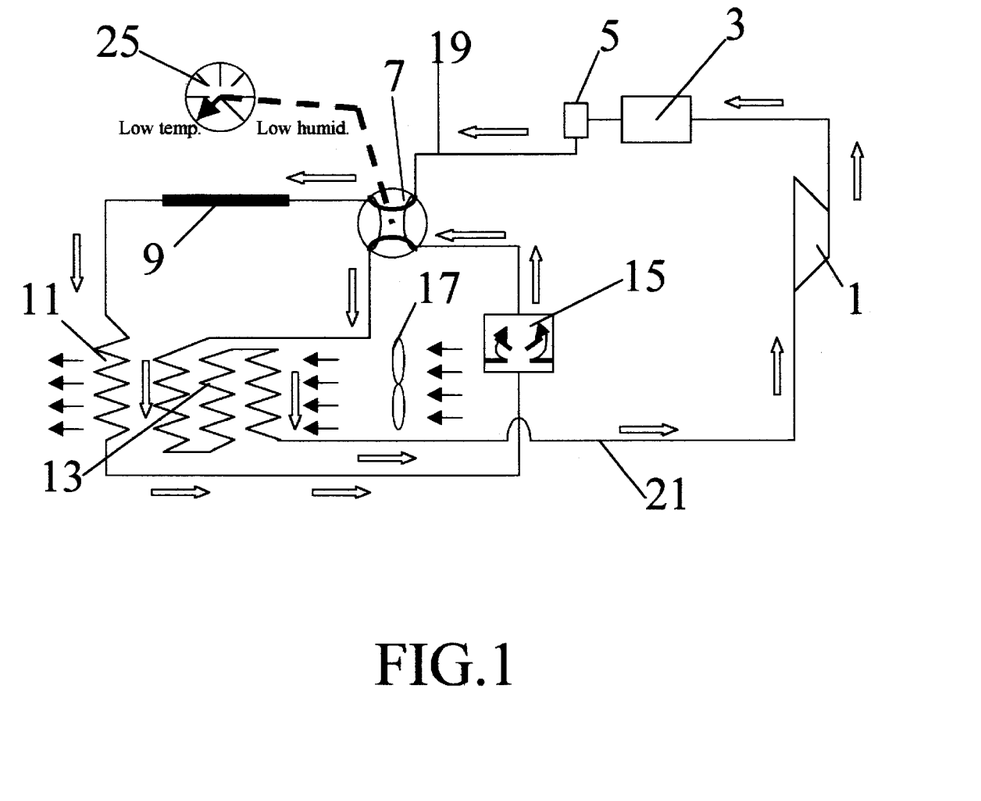
FIG. 1 is a diagrammatic view of an air conditioner with a restrictor in the cooling mode where the auxiliary coil works as a part of the evaporator.

As shown in FIG. 1, refrigerant compressed in compressor 1 flows to condenser 3 where it liquefies and rejects heat. After condenser 3 hot liquid refrigerant passes through optional dryer 5, which can also be a combination of receiver, strainer, and dryer. After is dryer 5 refrigerant reaches four-way valve 7, which now directs refrigerant to capillary tube 9 where refrigerant expands. Instead of capillary tube 9 an orifice, or a valve, or a combination of two piston type short tube restrictors, or other expansion device allowing the expansion of refrigerant in both directions can be used. After capillary tube 9 low pressure refrigerant flows to auxiliary coil 11, which now works as an initial part of evaporator 13. In auxiliary coil 11 liquid refrigerant partly evaporates, absorbing heat from air and delivering extra cooling potential to air moved first through evaporator 13 by fan 17. After coil 11 mixture of liquid and vapor refrigerant moves to restrictor 15. In this direction refrigerant freely flows through restrictor 15 and four-way valve 7 to evaporator 13. Restrictor 15 may be a piston type short tube restrictor or any other device combining a restriction of the refrigerant flow in one direction with a free pass of refrigerant flowing in the opposite direction. An example of other than the piston type restrictor is a combination of an orifice or a capillary tube restricting flow in one direction and a bypass line with a check valve for free pass in the opposite direction. After restrictor 15 refrigerant reaches evaporator 13 where the rest of liquid refrigerant evaporates. Then vaporized refrigerant flows through suction line 21 to compressor 1. The stream of initially warm air driven by fan 17 initially passes through evaporator 13, cools and partly dehumidifies there, and then flows through auxiliary coil 11 where it further cools and dehumidifies. The temperature of heat transfer surfaces in both evaporator 13 and auxiliary coil 11 is relatively high: usually 45–55° F. Because the amount of moisture condensing from air depends on this temperature, dehumidification of air in the air conditioner or heat pump working in this mode may be not sufficient.

Figure 2:
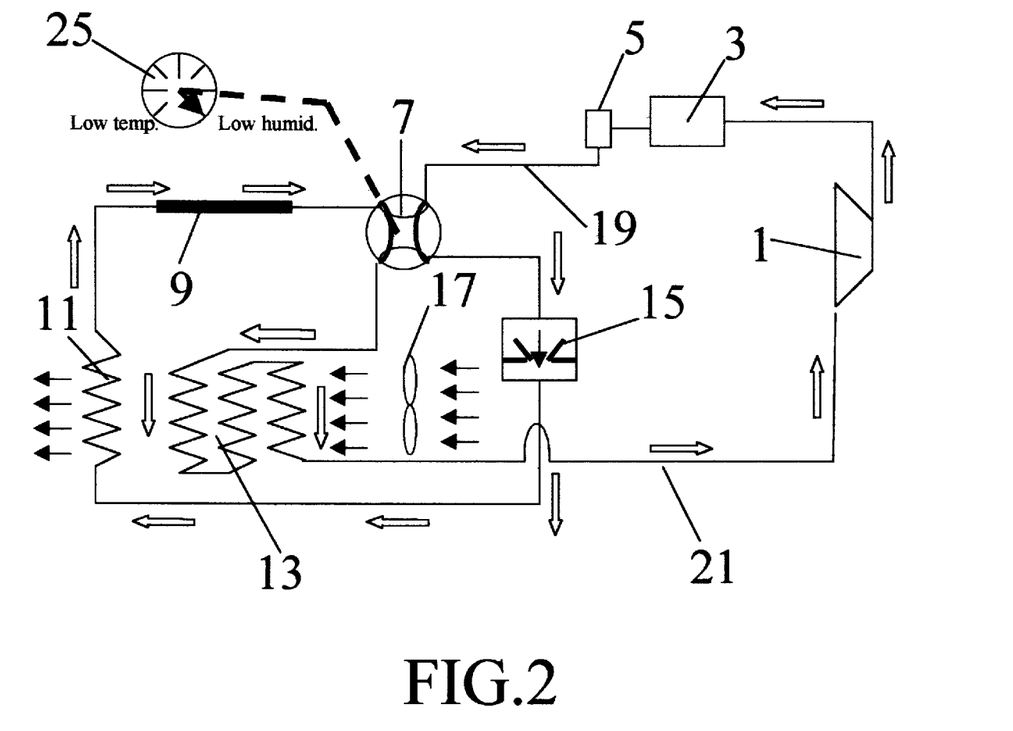
FIG. 2 is a diagrammatic view of the same air conditioner that is shown in FIG. 1 in the mode with enhanced dehumidification where refrigerant in the auxiliary coil rejects heat to air.

FIG. 2 shows a diagrammatic view of the same air conditioning or heat pump system operating in the dehumidification mode. Same as in the cooling operation refrigerant compressed in compressor 1 flows to condenser 3 where it liquefies and rejects heat. After condenser 3 hot liquid refrigerant passes through optional dryer 5, which can also be a combination of receiver, strainer, and dryer. After dryer 5 refrigerant reaches four-way valve 7, which now directs it to restrictor 15. In this direction refrigerant flows through the orifice of the restrictor, expands there and reaches auxiliary coil 11, which now works as a condenser and a subcooler. In coil 11 refrigerant expanded and partly vaporized in restrictor 15 recondenses rejecting heat to the air stream passed through evaporator 13. After auxiliary coil 11 liquid refrigerant moves to capillary tube 9, expands there and through four-way valve 7 flows to evaporator 13. Because of the pressure reduction in restrictor 15, the refrigerant pressure after capillary tube 9 is also lower compared to the conventional cycle. The evaporating pressure and temperature of the refrigerant evaporating in evaporator 13 and the temperature of heat transfer surface of the evaporator are also reduced and moisture condensation from air on the heat transfer surface of the evaporator is higher than in the conventional cycle. After evaporator 13 refrigerant flows through suction line 21 back to compressor 1. The stream of initially warm and humid air driven by fan 17 first passes through evaporator 13, cools and dehumidifies there, and then flows through auxiliary coil 11 where it absorbs heat from liquid refrigerant. Because the moisture condensation is higher, dehumidification of air in the air conditioner or the heat pump working in this mode is deeper than in the conventional cycle. In addition, because the air warms up absorbing heat from refrigerant in auxiliary coil 11, relative humidity of air is further reduced.

Figure 3:
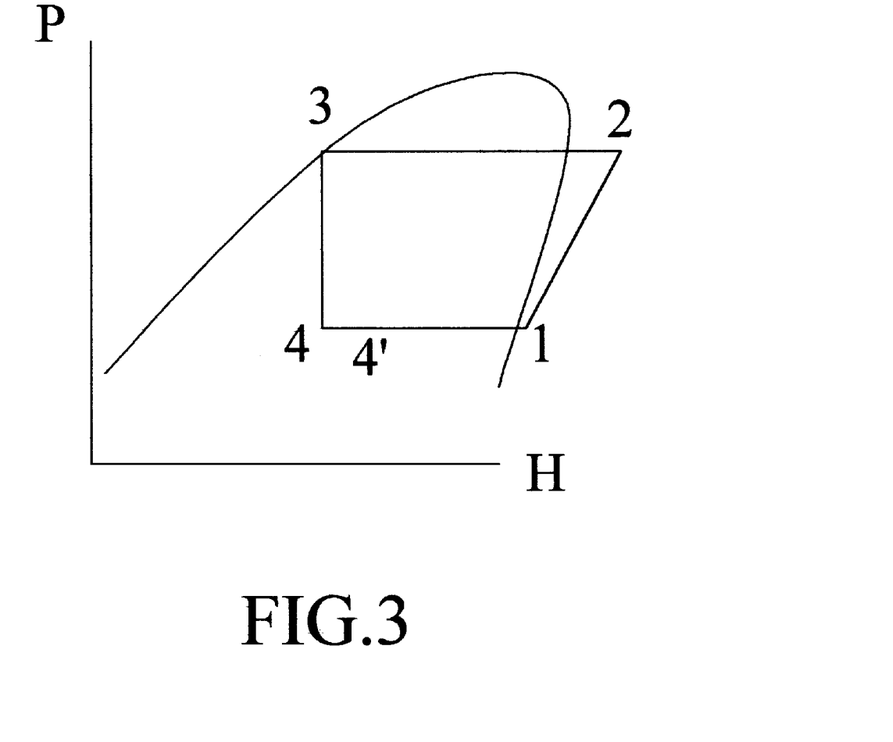
FIG. 3 is a P-H diagram of the air conditioner working according to the scheme of FIG. 1.
Figure 4:
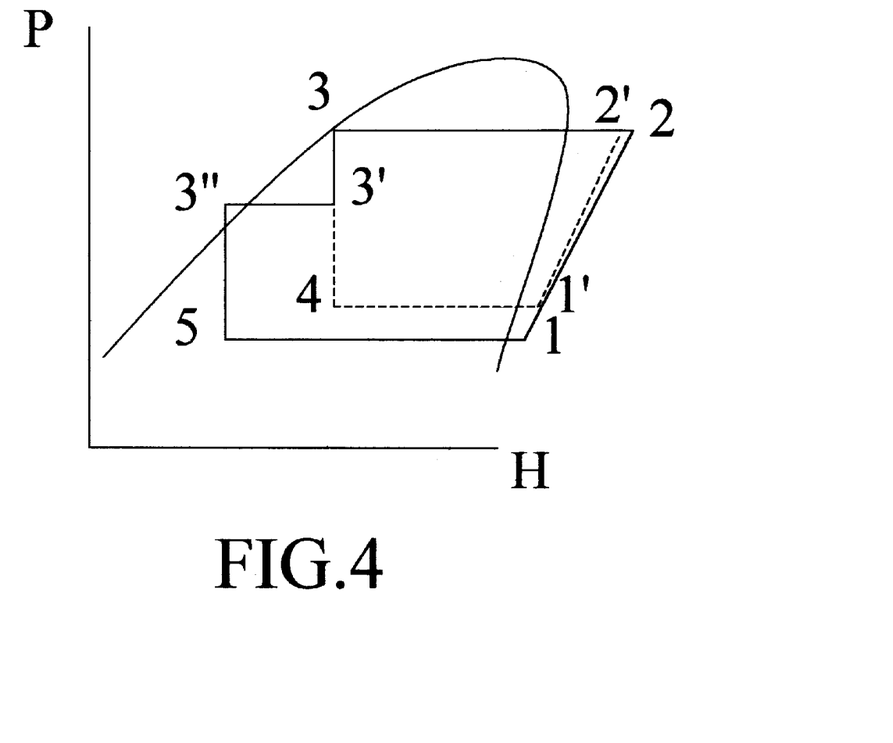
FIG. 4 is a P-H diagram of the air conditioner working according to the scheme of FIG. 2.

FIG. 3 and 4 depict P-H diagrams for both conventional operation of the air conditioner and operation with enhanced dehumidification.

FIG. 3 shows a conventional compression refrigeration cycle where line 1-2 presents compressing in compressor 1, line 2-3 shows desuperheating and condensing in condenser 3, line 3-4 shows expansion in capillary tube 9. Section 4-4' of line 4-1 presents evaporating in coil 11 and section 4'-1 of line 4-1 presents evaporating in evaporator 13.

FIG. 4 shows a compression refrigeration cycle with enhanced dehumidification. Line 1-2 represents compressing in compressor 1, line 2-3 shows desuperheating and condensing in condenser 3, line 3-3' shows expansion in restrictor 15, line 3'-3" represents recondensing of expanded in restrictor 15 refrigerant and subcooling liquid refrigerant in coil 11, line 3"-5 depicts expansion in capillary tube 9, and line 5-1 depicts evaporating in evaporator 13. For comparison, dash line 1'-2'-3-4 presents a conventional refrigeration cycle depicted on the FIG. 3. Because of the expansion in restrictor 15, evaporating pressure in the cycle with enhanced dehumidification is lower than the evaporating pressure in the conventional cycle: line 5-1 vs. line 4'-1'. Thus, the temperature of the heat transfer surface of the evaporator is lower too. That considerably increases moisture condensation on this surface. In addition, subcooling of refrigerant increases the cooling capacity of the evaporator: length of line 5-1 is larger than length of line 4'-1'. This extra enthalpy that refrigerant absorbs in auxiliary coil 11 in the cycle with enhanced dehumidification provides additional moisture condensation when air moves through evaporator 13. After evaporator 13 air flows through subcooler 11 where it picks heat shown by line 3'-3" from recondensing refrigerant. The temperature of air after coil 11 increases. Thus, when the air conditioner operates by the way shown on FIG. 2 and 4, both absolute and relative humidity of air after the air conditioner or heat pump are reduced compared to the conventional operation (FIG. 1, 3).

Restrictor 15 (FIG. 2) should be properly sized because too much expansion can drop the saturating temperature of refrigerant in coil 11 below the temperature of air flowing around the auxiliary coil. It is also possible that the saturating temperature in the auxiliary coil is still above the air temperature but the temperature difference is not enough to liquefy the entire refrigerant in the coil. Then expansion device 9 will force the pressure before the restrictor to rise, which will cause an increase of the refrigerant discharge pressure after compressor 1. It may bring a reduction in refrigeration capacity and efficiency of the air conditioner. Even if the restrictor is correctly designed, it is possible that at the first moment after a system start the temperature of air flowing around the auxiliary coil is too high to liquefy the entire refrigerant. Thus, refrigerant leaves the coil in partly vapor state, capacity of the air conditioner drops, in turn, air coming to the auxiliary coil is not cold enough, and the transition time to reach the design parameters may become excessive. Because of this, it looks more favorable always to start the air conditioner from the conventional (cooling mode) operation. In the short time, when the surface of the auxiliary coil cools down, the air conditioner can be turned to the mode with enhanced dehumidification or simply "dehumidification mode".

When the humidity is low, it is advantageous to run only the conventional cooling cycle because lowering evaporating temperature in the dehumidification cycle reduces the cooling capacity of the air conditioner. Also sometimes people favor the air temperature as cool as possible. In this case, the conventional cycle is also preferable.

When there is a call to reduce humidity in the room the conventional cycle may be switched to the dehumidification cycle. In a conventional air conditioner or a heat pump a thermostat sensing the room temperature controls the air conditioner or the heat pump operation. To control operation of the air conditioner or the heat pump system with dehumidification installation of a humidistat in addition to the thermostat or a combined thermostat-humidistat may be advantageous. Thus, an operator has the ability to set not only the required room temperature but also the required humidity. Preferable operation sequence: first, to reduce temperature in the room to the set temperature the thermostat sends a signal to start the system and to position four-way valve 7 to flow refrigerant the way of the conventional cooling cycle according to FIG. 1. When the temperature requirement is satisfied and the air humidity is above the humidity set level, the humidistat sends a signal to position four-way valve 7 to flow refrigerant the way of the cycle with enhanced dehumidification according to FIG. 2. When both humidity and temperature requirements are met, the control means shut down the system. Sometimes at the beginning of the system operation the air humidity is above the set point and the temperature requirement is already satisfied. However, it may still be advantageous always to start the system operation with the conventional cooling cycle. To operate this way, the control means are provided with a time relay to run the conventional cycle for a short time after the air conditioner or the heat pump starts.

There is a possibility that during the dehumidification cycle the temperature of the heat transfer surface of the evaporator drops below 32° F. It may cause the ice building on the surface of the evaporator. To protect the evaporator surface from excessive amount of ice a temperature sensor is provided. When the temperature of the evaporator surface reaches some predetermined level below 32° F. the sensor calls either to change the direction of the refrigerant flow in four-way valve 7 or to stop compressor 1 and to run fan 17.

Another way to control the operation of the system is to provide the control means by a thermostat and a time relay with an assigned time-share between the two cycles. FIG. 1 and 2 show regulator 25 controlling the positioning of four-way valve 7. An operator assigns the time-share setting the regulator either in an extreme "low temperature" position, or an extreme "low humidity" position, or in any intermediate position. A full cycle comprises of one cooling and one dehumidification subcycle (mode). The time relay regulates the time of the cycle and distribution between the cooling and the dehumidification subcycles. If the regulator is in "low temperature" position, the four-way valve entire time of the cycle directs the refrigerant flow according to FIG. 1, and if the regulator is in "low humidity" position, refrigerant entire time of the cycle flows according to FIG. 2. If the regulator is in an intermediate position, the time a relay manages the time-share between these two extremes. For example, the regulator is set in the position, which is one/thirds from the "low humidity" extreme and two/thirds from the "low temperature" extreme, and a fill cycle is set for 30 minutes. In this, case, the time relay runs the cycle according to FIG. 1 during 10 minutes, and according to FIG. 2 another 20 minutes. The air conditioner shuts down when the room temperature reaches the set point.

Time relay may also control the order of operation. It always provides the conventional cooling mode at the start of the system with a delay in switching to the dehumidification mode even if regulator 25 is in the extreme "low humidity" position.

To control the ice building on the surface of the evaporator at the dehumidification mode, especially if the regulator is in extreme "low humidity" position, an evaporator temperature sensor may be provided. When the temperature of the surface is below some predetermined level, the sensor calls either to change the direction of the refrigerant flow by repositioning of four-way valve 7 or to stop compressor 1 and to run fan 17 to melt ice from the surface.

To control the direction of refrigerant flow in both conventional and dehumidification modes four-way valve 7 can be substituted by a system of two-way and/or three-way valves.

If air conditioning and dehumidification of the room air is by a heat pump, the operation of the heat pump in the heating mode is as in a conventional heat pump.

Figure 5:
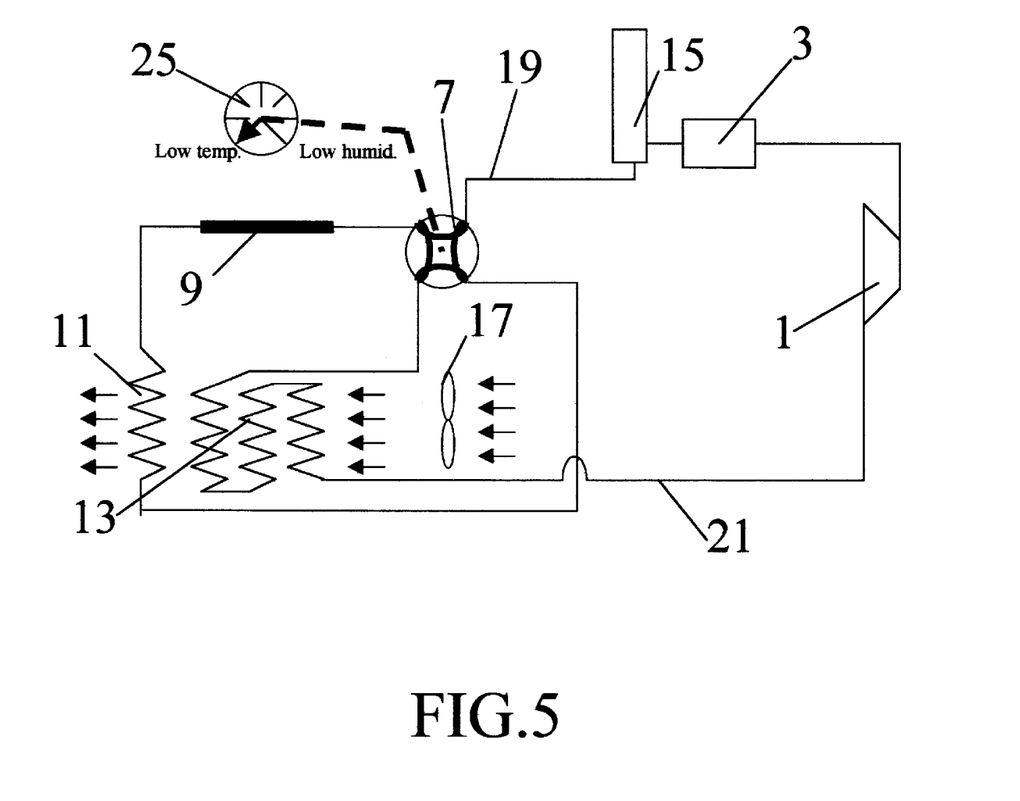
FIG. 5 is a diagrammatic view of the same air conditioner that is shown in FIG. 1 and 2 without a restrictor and with a receiver.

Sometimes, most often when the expansion device of the air conditioner or heat pump is a regulated device, e.g., an expansion valve with electronic control, there is no necessity in a restrictor. In this case refrigerant subcools without the expansion after the condenser (FIG. 5).

Figure 6:
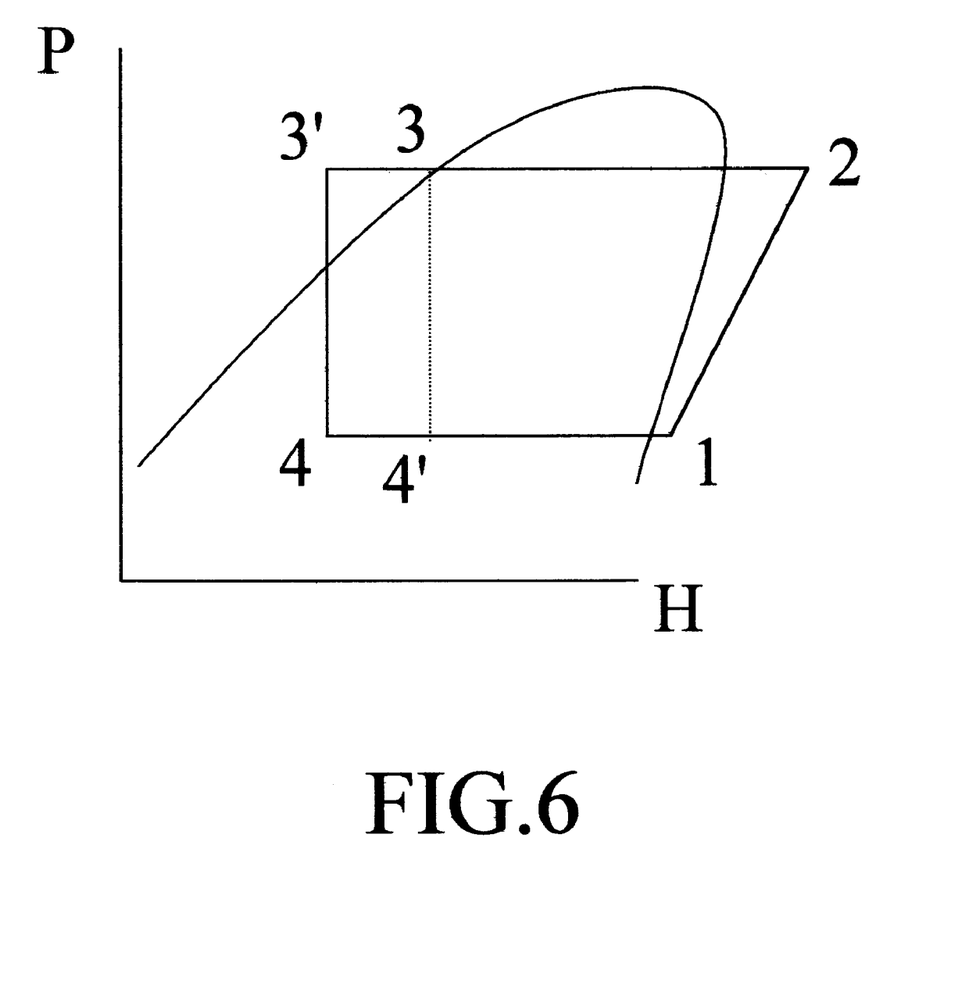
FIG. 6 is a P-H diagram of the air conditioner of FIG. 5 working in the subcooling mode.

The P-H diagram of this process is depicted on FIG. 6. Line 3-3' represents the conventional liquid subcooling. Again subcooling increases the cooling capacity of the evaporator. Extra enthalpy that refrigerant absorbs in evaporator 13, is shown by section 4-4' of line 4-1. However, because auxiliary coil 11 must be filled by liquid, an extra amount of refrigerant may be required. At the conventional operation this extra refrigerant may cause excessive pressure in the condenser.

Receiver 25 (FIG. 5) can help to overcome the problem. In the operation in the conventional cycle amount of liquid refrigerant in the receiver is high, because the receiver accommodates extra refrigerant. During the operation with subcooling the receiver keeps minimal amount of liquid refrigerant.

The difference in the dehumidification mode operation of a system with restrictor 15 (FIG. 2) and without this device (FIG. 5) is that after the expansion in the orifice of the restrictor refrigerant comes to auxiliary coil 11 partly in vapor state. The vapor can take most of the internal volume of the auxiliary coil. This, in turn, leads to the reduction of amount of refrigerant. It can allow running of the air conditioner without a receiver or using a much smaller receiver than one of the system depicted on FIG. 5. Thus, for a room air conditioner the dryer can simultaneously be a receiver also.

I claim:

1. An air conditioning and heat pump system for conditioning air including dehumidification, comprising:

a compressor for compressing gaseous refrigerant, a condenser for condensing refrigerant after exiting the compressor, a expansion device to expand high pressure liquid refrigerant, an evaporator for evaporating liquid refrigerant after the expansion device, an auxiliary coil either for subcooling or for evaporating liquid refrigerant, a restrictor positioned after the condenser and before the auxiliary coil, the restrictor expanding refrigerant in one direction and allowing a free refrigerant pass in the other direction, valve means to direct refrigerant to the auxiliary coil either a way to absorb heat by refrigerant from conditioning air in the auxiliary coil or a way to reject heat to conditioning air from refrigerant in the auxiliary coil, a fan for moving air to be conditioned against said evaporator and against said auxiliary coil, control means to control the operation of said compressor and said fan and to control the position of said valve means.

2. The system of claim 1, further comprising a receiver positioned after the condenser to accommodate extra amount of liquid refrigerant.

3. The system of claim 1, wherein the valve means is a four-way valve.

4. The system of claim 1, wherein the control means include a thermostat and a humidistat to control the valve means at the time when the system is in air conditioning operation to direct refrigerant flow to the auxiliary coil either the way of absorbing heat from air by refrigerant in the auxiliary coil or the way of rejecting heat to air from refrigerant in the auxiliary coil and to control the beginning and the end of the compressor and the fan operation.

5. The system of claim 4, wherein the control means further include an evaporator temperature sensor to stop the compressor at the evaporator temperature below predetermined level and to run the fan.

6. The system of claim 4, wherein the control means further include a time relay controlling the valve means always to direct refrigerant the way of absorbing heat from air by refrigerant in the auxiliary coil at least for a short time at a start of the compressor.

7. The system of claim 1, wherein the control means include a regulator with a time relay to control a time-share and a time limitation of the positioning of the valve means to direct refrigerant either the way of rejecting heat to air from refrigerant in the auxiliary coil or the way of absorbing heat from air by refrigerant in the auxiliary coil.

8. The system of claim 7, wherein the control means further include an evaporator temperature sensor to stop the compressor at the evaporator temperature below predetermined level and to run the fan.

9. A method for conditioning air with dehumidification using an air conditioning and heat pump system, the system including a refrigerant circuit and an air circuit, the refrigerant circuit including in serial connection a compressor, a condenser, an expansion device, a restrictor expanding refrigerant in one direction and allowing a free pass in the other direction, an auxiliary coil, an evaporating coil, and valve means to direct refrigerant flow after the condenser either to the restrictor and then to the auxiliary coil or to the expansion device and then to the auxiliary coil and to direct refrigerant flow after the auxiliary coil either to the expansion device and then to the evaporating coil or to the restrictor and then to the evaporating coil, the air circuit including a fan moving air to be conditioned, the method comprising a cooling mode and a dehumidification mode of the system operation including the steps:

(i) in the cooling mode:

compressing gaseous refrigerant in the compressor, condensing refrigerant in the condenser, flowing liquid refrigerant to the expansion device, expanding refrigerant in said expansion device, flowing refrigerant to the auxiliary coil, partly evaporating refrigerant in said auxiliary coil to cool said coil and passing air, flowing refrigerant to the restrictor, flowing refrigerant through the restrictor in the free pass direction, flowing partly liquid, partly vapor refrigerant to the evaporating coil, completely evaporating refrigerant in said evaporating coil to cool said coil and passing air, flowing vaporized refrigerant to said compressor, moving a stream of warm air against said evaporating coil and against said auxiliary coil to cool said air; and (ii) in the dehumidification mode:

compressing gaseous refrigerant in the compressor, condensing refrigerant in the condenser, flowing liquid refrigerant to the restrictor, expanding refrigerant in the restrictor, flowing expanded refrigerant to the cooled auxiliary coil, condensing a part of refrigerant vaporized in said restrictor and subcooling liquid refrigerant in the auxiliary coil and partly warming passing air, flowing cooled liquid refrigerant after said auxiliary coil to the expansion device, expanding refrigerant in the expansion device, flowing refrigerant to the evaporating coil, evaporating refrigerant in said evaporating coil and cooling and dehumidifying passing air, flowing vaporized refrigerant to said compressor, moving the stream of warm air against said evaporating coil to cool and dehumidify said air stream, moving said cooled and dehumidified stream of air against said auxiliary coil to condense and subcool expanded in the restrictor refrigerant and partly to warm said air stream.

* * * * *